C. T. SLEEPER.
PACKING FOR PISTON-RODS, &c.

No. 191,891. Patented June 12, 1877.

WITNESSES:
Chas. R. Otis
Jacob D. Felthousen

INVENTOR:
Chas. T. Sleeper

C. T. SLEEPER.
PACKING FOR PISTON-RODS, &c.

No. 191,891. Patented June 12, 1877.

WITNESSES:
Chas. R. Otis
Jacob D. Fetthousen

INVENTOR:
Chas. T. Sleeper

UNITED STATES PATENT OFFICE.

CHARLES T. SLEEPER, OF CHICAGO, ILLINOIS, ASSIGNOR OF ONE-HALF HIS RIGHT TO MARY E. OTIS; SAID OTIS ASSIGNOR TO GEORGE G. BENEDICT, OF SAME PLACE.

IMPROVEMENT IN PACKING FOR PISTON-RODS, &c.

Specification forming part of Letters Patent No. 191,891, dated June 12, 1877; application filed March 20, 1876.

*To all whom it may concern:*

Be it known that I, CHARLES T. SLEEPER, of Chicago, Cook county, Illinois, have invented an Apparatus for Packing the Piston-Rods and Valve-Stems of Steam-Engines, of which the following is a specification:

The object of my invention is to pack the piston-rods and valve-stems of steam-engines with a metallic packing that will close automatically around the rod or stem as it wears, and keep tight by its own action and the pressure of the steam.

Figure 1:
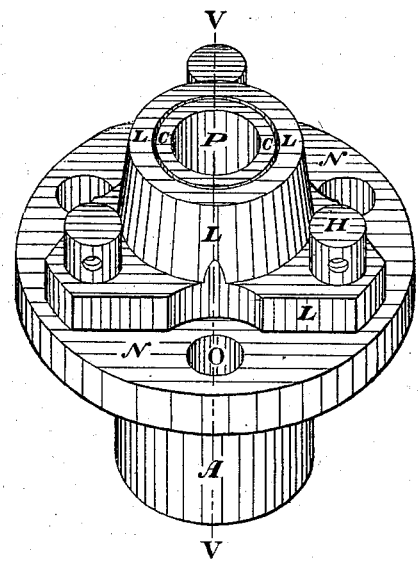
Figure 2:
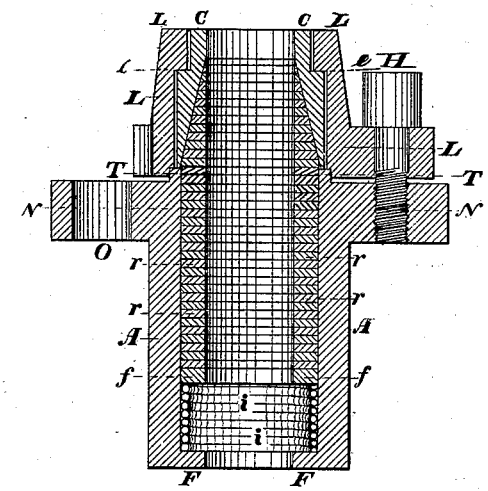
Figure 3:
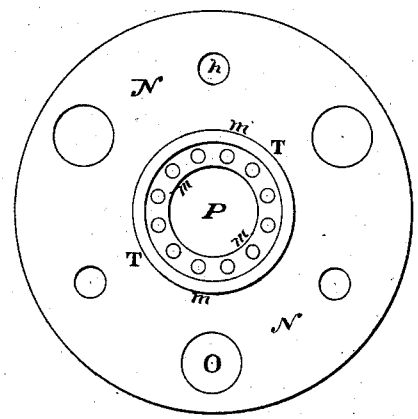
Figure 4:
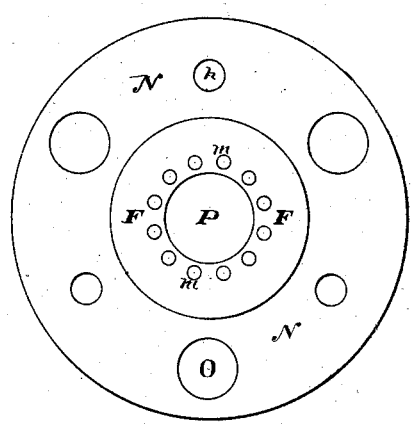
Figure 5:
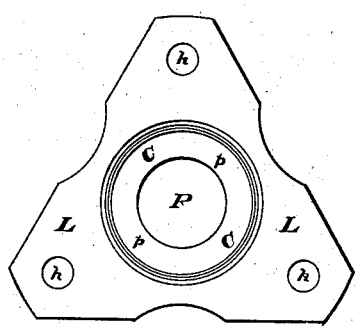
Figure 6:
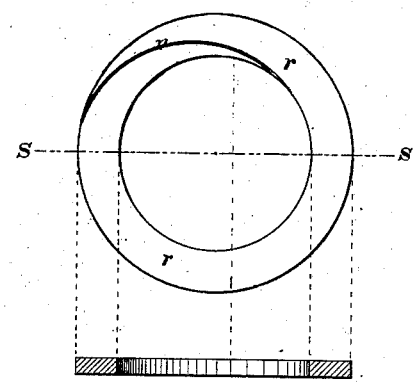
Figure 7:
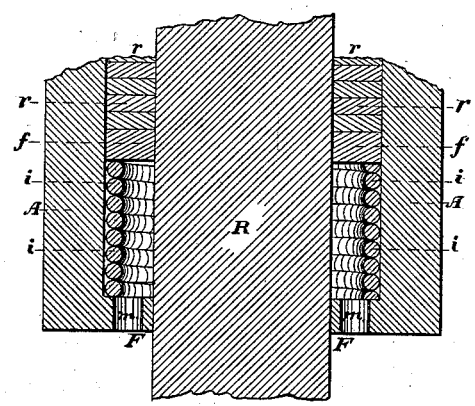

Figure 1 is a perspective view. Fig. 2 is a sectional view, showing the arrangement of all parts when cut in two through the center. (Refer to line V V, Fig. 1.) Fig. 3 is a view of the cylinder, showing the front of the same with the necessary holes for bolts, and the inside flange at the back with its perforations for admitting the steam. Fig. 4 is the reverse of Fig. 3. Fig. 5 is a view of the lower end of the double cone. Fig. 6 is a view of the metallic packing-rings. Fig. 7 is a sectional view of the cylinder, showing the spiral spring, the follower, and a section of the piston-rod or valve-stem.

The cylinder A, Fig. 2, is made with a heavy flange, N, Fig. 2, at the outer end, projecting to a suitable distance, to allow room for the holes O, Fig. 2, through which the studs on the stuffing-box pass, and is also furnished with the screw-holes *h*, Figs. 3 and 4, to admit the screws, which fasten the cone to its face. A projecting rim, T T, Figs. 2 and 3, runs around the inner circle, and keeps the rubber gasket, used for the purpose of making a steam-tight joint between the cylinder and cone, from being pressed into the cylinder. On the inner or opposite end of the cylinder is a small flange, projecting inward, letter F, Fig. 2, and perforated with holes *m m*, Figs. 3 and 4, to admit the necessary amount of steam. This flange is also used as a rest for the spring *i i*, Figs. 2 and 7. The double cone L and C, Figs. 1, 2, and 5, is made in two parts, with a ground shoulder-joint, *e e*, Fig. 2, for the purpose of overcoming any lateral motion of the piston-rod or valve-stem. The inside of the cone C, Fig. 2, is made tapering, for the purpose of closing the metallic packing-rings around the piston-rod or valve-stem when forced into it by the pressure of steam upon the follower *f*, Figs. 2 and 7, thus causing them to wear away on the inside, and form a ground joint around the rod. The outside of the cone L, Figs. 1, 2, and 5, is provided with projecting flanges, through which are holes *h h h*, Fig. 5, corresponding to the small holes *h* in the flange N, Figs. 3 and 4, which admit the screw-bolts H, Figs. 1 and 2, which fasten it to the cylinder A, as shown in Figs. 1 and 2, and, when bolted together, the whole forms a chamber around the rod, to hold the metallic packing-rings and the spiral spring and follower, as shown in Figs. 2 and 7. The spiral spring *i i*, Figs. 2 and 7, is used for keeping the metallic packing-rings from being displaced by the movement of the piston-rod or valve-stem when there is no steam being used.

The diameter of the bore of cylinder A exceeds the diameter of the piston-rod sufficient to receive the packing-rings, and is of uniform diameter its entire length from the flange F to its junction with the bore of cone C, and the bore of the cone, at its juncture with the cylinder, is equal to the bore of the cylinder, and decreases toward the outer end until it is equal in diameter to the diameter of the piston-rod, as shown in Fig. 2.

The object of this construction of the cylinder and cone is to admit of filling the cylinder with packing-rings, which are forced from the cylinder into the cone by the pressure of steam as the rings in the cone are worn away by the friction of the piston-rod.

The rings *r r* are made with curved lap-joints, the curve being eccentric to the ring, as shown in Fig. 6. By this construction the rings, as they are forced out of the supply-cylinder A into the cone C, close up regularly, each side of the lap sliding upon the surface adjacent thereto, the ring wearing equally on all sides until it is nearly or entirely worn away.

I have by practical tests tried various forms of joints, such as tangential, angular, and side laps, but have found them deficient, in that the ends will not ride around upon the adjacent surface and close the ring, for the reason that the lap is not long enough and the joints jam and stick, thereby choking the entire set and preventing them from being fed forward. These rings can be made of any metal that will stand heat without melting or fusing.

The cone C is so adjusted within the cone L as to admit of a lateral movement, the object of which is to allow it to adjust itself to the position of the piston-rod should the packing-cylinder A be out of line with the piston-rod.

The means of applying this apparatus to an engine is very simple, as it is constructed in such a manner as to require no alteration to be made upon the engine.

When applying it, I disconnect the piston-rod or valve-stem, push my cylinder into the stuffing-box, allowing the studs to pass through the holes O in the flange, and with the proper nuts fasten it firmly against the face of the stuffing-box. I then slip my spring over the rod or stem; after it the follower, rings, and cone. I then connect the rod, push the cone against the rings, forcing them into the cylinder, and bolt the cone, by means of the screw-bolts H, to the flange of the cylinder.

When the apparatus is first applied, the rings which fill the cone are made a proper taper, to give them a bearing on the cone. After this they fit the cone of their own action.

What I claim as my invention is—

1. A packing-ring, having a curved lap-joint, the faces being curved, substantially as shown and described.

2. A packing-ring, having a curved lap-joint, the curve being eccentric to the ring, substantially as described.

3. The combination, with the cylinder A and laterally-movable cone C, as described, of the series of packing-rings $r$, adjusted within the cylinder and cone, substantially as specified.

4. The combination, with the cylinder A, cone C, and the series of packing-rings $r$, of the cone L, having the shoulder $e$ adjusted to bear against a corresponding shoulder on the cone C, substantially as and for the purpose specified.

CHARLES T. SLEEPER.

Witnesses:
   JACOB D. FELTHOUSEN,
   CHAS. K. OTIS.